(12) United States Patent
Klink (10) Patent No.: US 11,616,655 B2
(45) Date of Patent: Mar. 28, 2023

(54) ASYMMETRIC CRYPTOGRAPHY ASSISTED AUTHENTICATION AND ACCESS PROTOCOLS

(71) Applicant: SERA4 LTD., Waterloo (CA)

(72) Inventor: Jerod D. Klink, Kitchener (CA)

(73) Assignee: SERA4 LTD., Waterloo (CA)

( * ) Notice: Subject to any disclaimer, the term of this patent is extended or adjusted under 35 U.S.C. 154(b) by 198 days.

(21) Appl. No.: 16/894,374

(22) Filed: Jun. 5, 2020

(65) Prior Publication Data

US 2020/0389327 A1 Dec. 10, 2020

Related U.S. Application Data

(60) Provisional application No. 62/857,388, filed on Jun. 5, 2019.

(51) Int. Cl.
| | |
|---|---|
| *H04L 9/32* | (2006.01) |
| *H04L 9/30* | (2006.01) |
| *G07C 9/00* | (2020.01) |
| *E05B 47/00* | (2006.01) |

(52) U.S. Cl.
CPC ........ *H04L 9/3268* (2013.01); *E05B 47/0001* (2013.01); *G07C 9/00182* (2013.01); *H04L 9/30* (2013.01)

(58) Field of Classification Search
CPC ..... H04L 9/3268; H04L 9/30; E05B 47/0001; G07C 9/00182
See application file for complete search history.

(56) References Cited

U.S. PATENT DOCUMENTS

| | | | | |
|---|---|---|---|---|
| 9,704,316 | B2* | 7/2017 | Kirkjan | G07C 9/00309 |
| 10,012,009 | B2* | 7/2018 | Jahnsèn | E05B 65/46 |
| 10,114,938 | B2* | 10/2018 | Marchiori | G07C 9/00174 |
| 2007/0290797 | A1* | 12/2007 | Harkins | G07C 9/00309 340/5.5 |
| 2009/0183541 | A1* | 7/2009 | Sadighi | G07C 9/00309 70/320 |
| 2011/0084799 | A1* | 4/2011 | Ficko | G07C 9/27 340/5.65 |
| 2012/0096909 | A1* | 4/2012 | Hart | H04B 5/0012 70/278.1 |
| 2014/0258711 | A1* | 9/2014 | Brannon | H04L 63/0823 713/156 |

(Continued)

*Primary Examiner* — Yonas A Bayou
(74) *Attorney, Agent, or Firm* — Perry + Currier Inc.

(57) ABSTRACT

A lock for securing access to a physical resource is provided. The lock includes a wireless interface configured for communication with a plurality of lock access devices in vicinity of the lock. The wireless interface is further configured to receive digital certificates from the plurality of lock access devices. The lock further includes a memory configured to store a public key, and a processor configured to authenticate a digital certificate received from a lock access device using the public key. The processor may further be configured to extract a wait time parameter, scheduled access period parameter, or re-use parameter from the digital certificate. In addition, the processor is configured to unlock the lock after a delay period based on the wait time parameter, during a scheduled access period based on the scheduled access period parameter, or based on the number of times indicated by the re-use parameter.

18 Claims, 6 Drawing Sheets

(56) References Cited

U.S. PATENT DOCUMENTS

| | | | |
|---|---|---|---|
| 2014/0375422 A1* | 12/2014 | Huber | G07C 9/00571 |
| | | | 340/5.61 |
| 2015/0235496 A1* | 8/2015 | Vecchiotti | H04W 84/12 |
| | | | 340/5.61 |
| 2017/0103595 A1* | 4/2017 | Taylor | G06K 7/10881 |
| 2017/0345237 A1* | 11/2017 | Kuenzi | H04W 12/35 |
| 2020/0027295 A1* | 1/2020 | Bigert | H04W 4/02 |

* cited by examiner

ASYMMETRIC CRYPTOGRAPHY ASSISTED AUTHENTICATION AND ACCESS PROTOCOLS

CROSS-REFERENCE TO RELATED APPLICATIONS

This application claims the benefit of U.S. Patent Application No. 62/857,388, filed Jun. 5, 2019 and is incorporated herein by reference.

FIELD OF INVENTION

This invention relates to security, and more specifically, to secure locking of physical resources using asymmetric cryptography.

BACKGROUND

Known techniques for securing physical resources, such as buildings, include providing an electronic lock to a door and then configuring the lock to respond to the presence of an access card, key code, or similar. More recent systems use smartphones to open electronic locks.

When used to secure physical resources located at remote locations, portable electronic locks tend to be used, so that administrators may easily secure a physical resource without the need for installing dedicated wiring, and so that administrators may easily swap, replace, relocate, and perform maintenance on the locks. Portable locks, however, are prone to theft and misplacement. Furthermore, for locks used to protect remote or infrequently accessed physical resources, those trying to gain unauthorized access to the physical resource, or to steal or tamper with its locks, have much more time and ability to do so without timely detection.

In industrial or enterprise contexts, where access to portable electronic locks is monitored by a central system, one may not be confident that any particular lock is properly securing the properly physical resource merely by the detection of a signal indicating that the lock is closed. Indeed, the lock may be improperly placed to secure the wrong physical resource or may have been removed off site. Hence, conventional techniques for using electronic locks are incapable of adequately securing such resources.

SUMMARY

According to an aspect of the present disclosure, a lock for securing access to a physical resource is provided. The lock includes a wireless interface configured for communication with a plurality of lock access devices in vicinity of the lock. The wireless interface is further configured to receive digital certificates from the plurality of lock access devices. The lock further includes a memory configured to store a public key. In addition, the lock includes a processor configured to authenticate a digital certificate received from a lock access device using the public key. The processor is further configured to extract a wait time parameter from the digital certificate. In addition, the processor is configured to control an electrical actuator of the lock to unlock the lock after a delay period based on the wait time parameter.

According to another aspect of the present disclosure, a lock for securing access to a physical resource is provided. The lock includes a wireless interface configured for communication with a plurality of lock access devices in vicinity of the lock. The wireless interface is further configured to receive digital certificates from the plurality of lock access devices. The lock further includes a memory configured to store a public key. In addition, the lock includes a processor configured to authenticate a digital certificate received from a lock access device using the public key. The processor is further configured to extract a scheduled access period parameter from the digital certificate and to limit the electrical actuator to unlock the lock during a scheduled access period based on the scheduled access period parameter.

According to another aspect of the present disclosure, a lock for securing access to a physical resource is provided. The lock includes a wireless interface configured for communication with a plurality of lock access devices in vicinity of the lock. The wireless interface is further configured to receive digital certificates from the plurality of lock access devices. The lock further includes a memory configured to store a public key. In addition, the lock includes a processor configured to authenticate a digital certificate received from a lock access device using the public key. The processor is further configured to extract a re-use parameter from the digital certificate and to limit the electrical actuator to unlock the lock a number of times indicated by the re-use parameter.

DETAILED DESCRIPTION

The present invention aims to solve at least one of the problems discussed above. Specifically, the present invention uses digital signatures to securely authenticate and provide access to the lock. Digital signatures are used to help mobile devices avoid communicating with imposter locks and to prevent mobile devices from using forged access data to open electronic locks. The present invention solves problems that arise when further control and/or flexibility in access is desired with electronic locks.

A problem that arises concerns behavior that is present in other locks, but may create security flaws when implemented in electronic locks that are unlocked using lock access devices. For example, one problem that arises concerns wait periods that are available in bank vaults. Certain bank vaults have a wait period after being unlocked, before the vault can be opened. Implementing the same function in electronic locks that are unlocked using lock access devices may be done on the lock access device, where a timer is set on the lock access device, and after the timer runs out, the unlock command is sent from the lock access device to the electronic lock. However, this is inherently unsecure, as the signal being sent to the lock can be spoofed to bypass a time constraint.

Another example concerns scheduled access periods. With a normal lock, access to the lock can be controlled by a key. As such, if access were only to be permitted on certain days of the week, or for a certain period of time, then the key may only be given to the person unlocking the lock on those days. Implementing the same function in electronic locks that are unlocked using lock access devices may be done by setting blackout or whiteout periods of access on the lock access device. Unlock commands may be sent from the lock access device based on a schedule on the lock access device. However, similar to the above, this is inherently unsecure, as the signal being sent to the lock can be spoofed to bypass the blackout or whiteout period.

Another example concerns the ability to unlock a lock for a specified number of times. Similar to a normal lock, access to the lock can be controlled by a key, and the number of times a lock is accessed can be tracked. As indicated above, with an electronic lock that is unlocked from a lock access device, this can be implemented on the device itself, by keeping track of the number of times the lock is accessed on the device, or on a server, and then sending the unlocking signal if the number of re-uses is validated. However, this is again inherently unsecure, as the unlocking signal being sent to the lock can be spoofed without checking the number of times the lock has been accessed previously.

The present disclosure discusses electronic locks and the use of digital certificates to provide authentication and access to electronic locks. Unlocking the lock is performed securely by using digital certificates containing parameters. The lock authenticates the digital certificate that is received from the lock access device, and then proceeds to extract the parameters that instruct the lock on how to proceed, whether that is to wait for a certain period to unlock, or to unlock during certain days of the week. Spoofing the digital certificate and its parameters is far more difficult, and hence more secure than implementing security measures on the lock access device itself.

Figure 1:
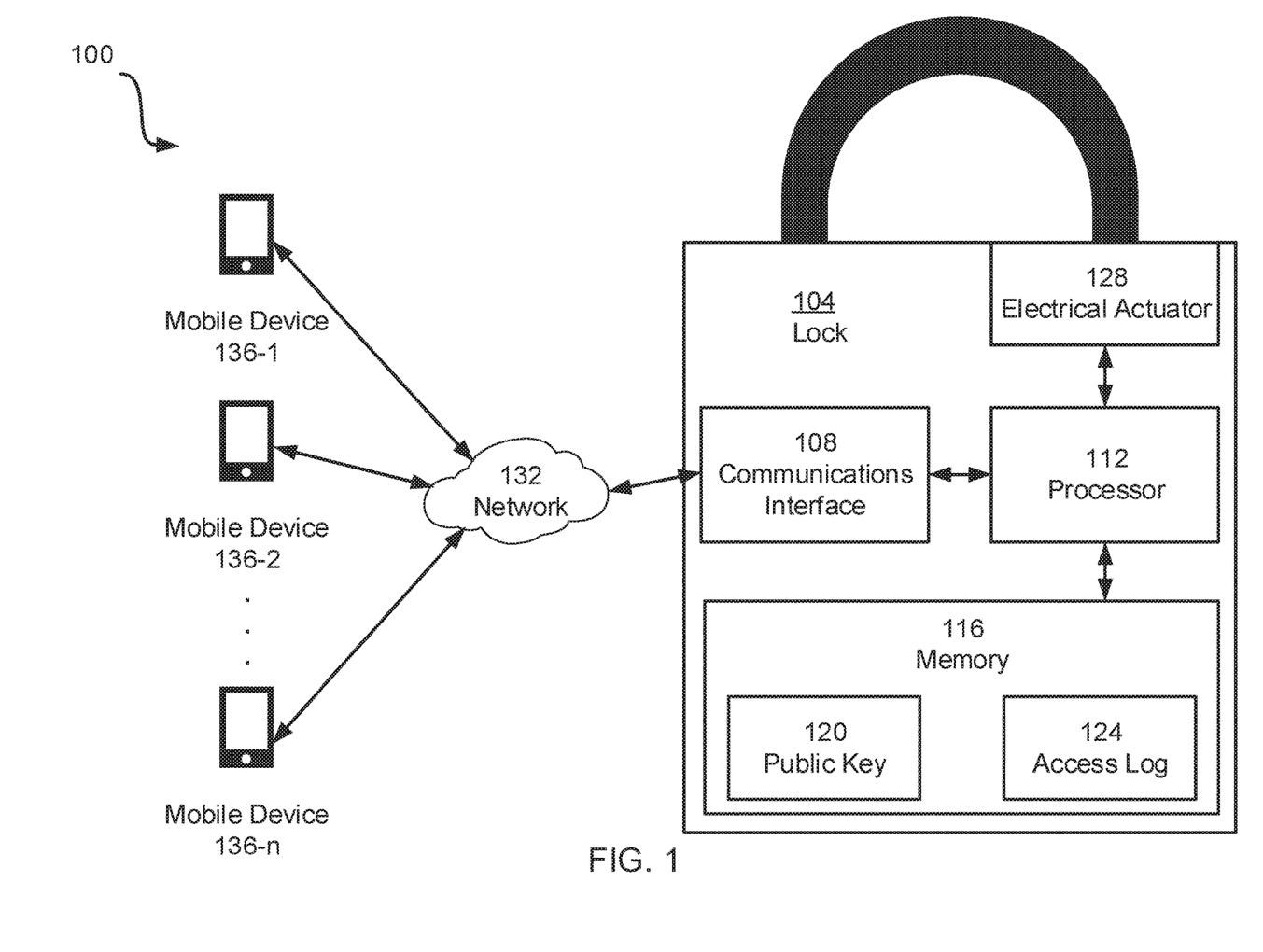
FIG. 1 is a diagram of an example lock that can be unlocked through the use of digital certificates from lock access devices.

FIG. 1 depicts an example system 100 for using digital certificates with electronic locks. System 100 includes a lock 104, a network 132, and a plurality of lock access devices 136. (Lock access devices 136-1, 136-2 . . . 136-n are referred to herein individually as lock access device 136 and collectively as lock access devices 136. This nomenclature is used elsewhere herein.)

Lock access devices 136 act as a graphical user interface (GUI) or a front-end for users to access lock 104. Lock access devices 136 may include desktop computers, servers, laptop computers, tablets, smart phones, or the like. An example lock access device 136 may include a processor, a memory including instructions executable by the processor, a communications interface to connect to lock 104 through network 132, input and output devices. In the current embodiment in FIG. 1, lock access devices 136 are portrayed as wireless mobile devices, however, lock access devices 136 may be any device that can access lock 104.

Lock access devices 136 are connected to lock 104 via network 132. Network 132 can include any one of or any combination of a local area network (LAN) defined by one or more routers, switches, wireless access points or the like. Network 132 may also include any suitable wide area network (WAN) including cellular networks, cellular radio, low-power wide-area network (LPWAN), and the Internet.

In alternate embodiments, lock access devices 136 are connected to lock 104 directly without network 132. Lock access devices 136 may be connected to lock 104 through Bluetooth, Near Field Communication (NFC) or infrared.

Lock 104 includes a memory 116, a processor 112, a communications interface 108 and an electrical actuator 128. Memory 116 includes a non-transitory computer-readable medium that may include volatile storage, such as random-access memory (RAM) or similar, and may include non-volatile storage, such as a hard drive, flash memory, and similar.

Memory 116 stores public key 120 and access log 124. Public key 120 is paired with a corresponding private key and allows lock 104 to authenticate received digital certificates. Private key and public key 120 pairs are generated on a separate sever. The private key is then used to digitally sign digital certificates, while public key 120 is provided to lock 104 and stored in memory 116. Use of private key 120 for authentication of the digital certificate will be discussed further below.

Access log 124 stores a log of access of any lock access device 136 that sends a digital certificate to lock 104. Access log 124 may include data regarding the digital certificate, such as a time stamp of access, the lock access device 136 that sent the digital certificate, whether the digital certificate is valid or authenticated, and any parameters associated with the digital certificate. Access log 124 can be used for different functions, including providing an audit trail of access for security purposes, or providing a trail for troubleshooting purposes. Further use of access log 124 will be discussed further below.

Lock 104 includes communications interface 108. Communications interface 108 allows lock access devices 136 connect to lock 104. Communications interface 108 may also allow for local connectivity to processor 112, or access to processor 112 via another computing device and connected input and output devices (not shown). Examples of input devices include, but are not limited to, a keyboard, a mouse, or a touchscreen. Examples of output devices include, but are not limited to, a display showing a user interface. Different input and output devices and a variety of methods of connect to processor 112 either locally or via communications interface 108, may be used.

Electrical actuator 128 allows for the locking and unlocking of lock 104 through electronic means. Commands are sent from processor 112 to electrical actuator to either unlock lock 104, or to re-lock 104. Electrical actuator 128 is isolated from communications interface 108, meaning that commands to unlock lock 104 through electrical actuator 128 come from processor 112.

Figure 2:
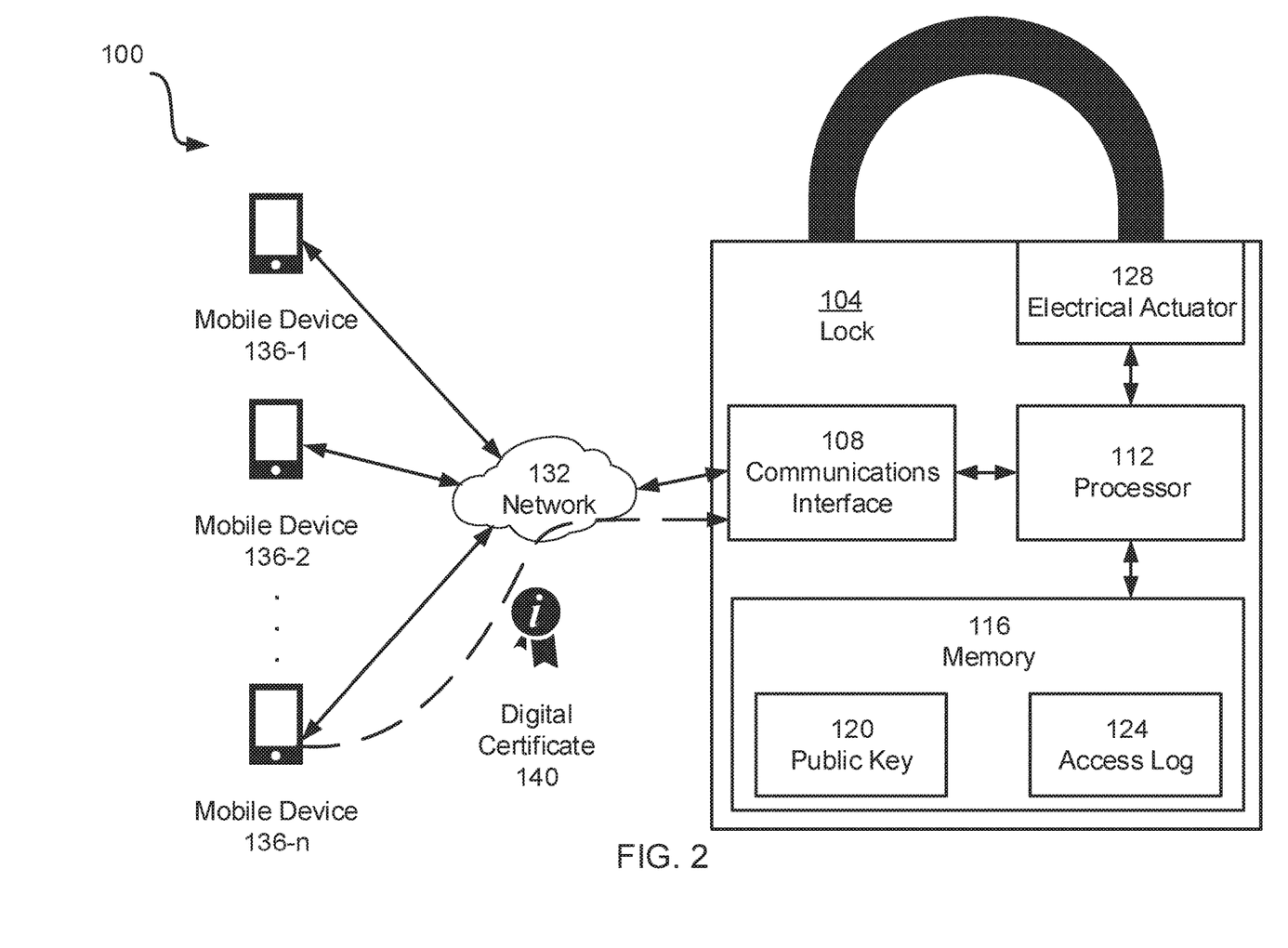
FIG. 2 is a diagram of an example digital certificate transmitted to the example lock of FIG. 1 from lock access devices.

Referring to FIG. 2, an example system 100 is depicted, in which a digital certificate 140 is sent from lock access device 136-n through network 132 to lock 104. Communications interface 108 receives digital certificate 140, after which processor 112 authenticates digital certificate 140 to validate its authenticity. If digital certificate 140 is authentic, then processor 112 will act upon digital certificate 140 and provide access to lock 104. The authentication process will be further discussed below.

Figure 3:
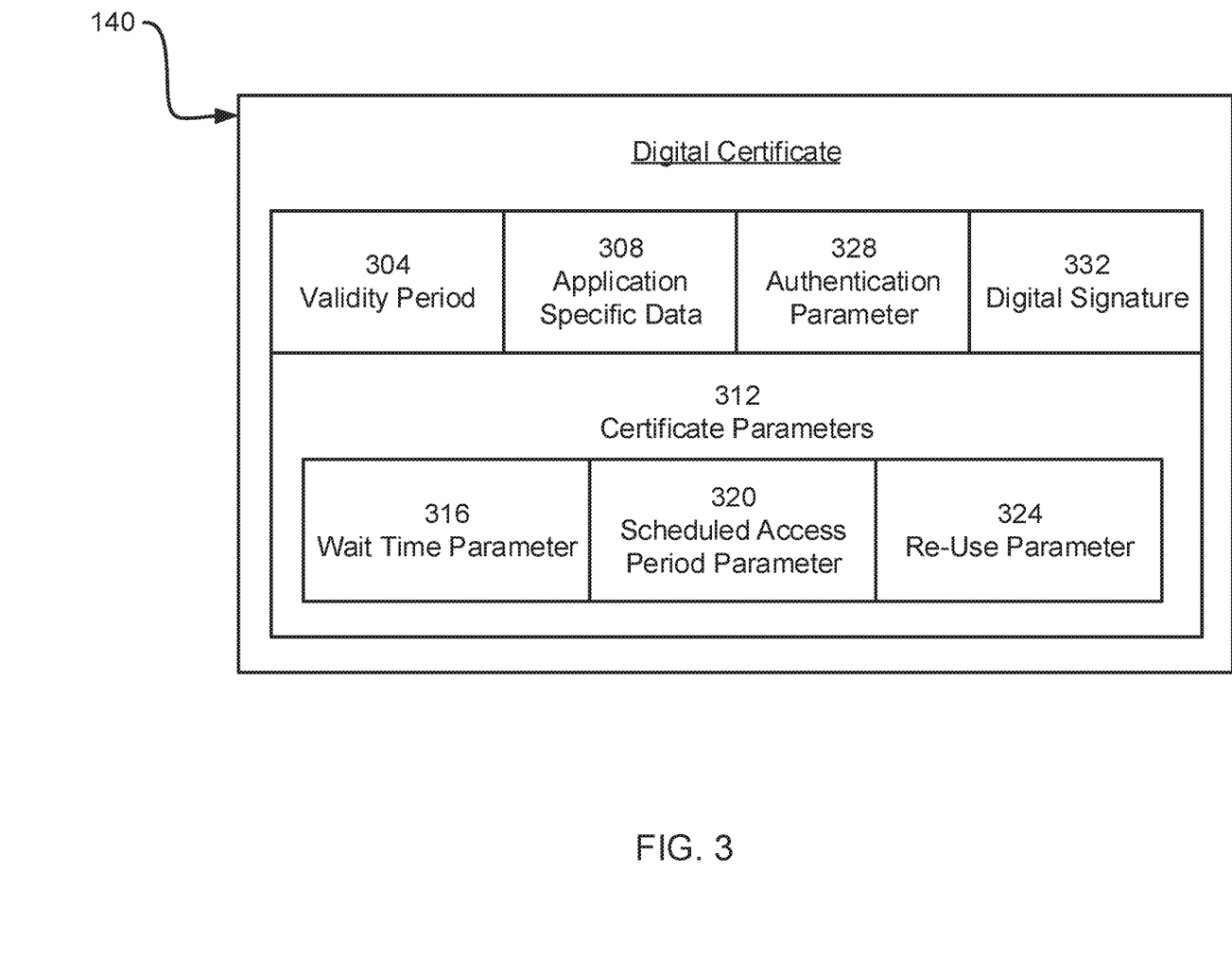
FIG. 3 is a diagram of an example digital certificate.

Referring to FIG. 3, an example digital certificate 140 is shown. Digital certificate 140 may include validity period 304, application specific data 308, authentication parameter 328, digital signature 332 and certificate parameters 312. Each component of digital certificate 140 provides a different data block that is used by processor 112 to determines what actions to perform. A digital certificate 140 may be unique to a user, a group of users, or a mobile device, so that various amounts of access to a resource secured by a lock 104 may be provided to different people.

Validity period 304 is a parameter that indicates the life span of digital certificate 140. If digital certificate 140 is processed by processor 112 outside the validity period 304, then processor 112 determines not to provide access to the sending lock access device 136 to lock 104. Processor 112 may check the validity period 304 against the system time (also known as the current time) on lock 104. For example, validity period 304 has a starting date of May 8, 2020, and an ending date of May 8, 2021. After authenticating digital certificate 140, processor 112 may check system time on lock 104 and determine system time shows a date of Jun. 8, 2020. As the system time on lock 104 is within validity period 304, processor 112 can determine that digital certificate 140 is valid. Similarly, if system time on lock 104 shows a date of Jun. 8, 2021, then processor 112 can determine that digital certificate 140 is not valid.

Private key and public key 120 pairs are generated by a server (not shown), and then digital certificate 140 is digitally signed with digital signature 332. Public key 120 is provided to lock 104. Lock access device 136 sends digital certificate 140 with digital signature 332 to lock 104, where processor 112 matches the corresponding digital signature 332 and public key 120 for authentication to ensure that digital certificate 140 is authentic and valid.

Certificate parameters 312 may include wait time parameter 316, scheduled access period parameter 320, and re-use parameter 324. Certificate parameters 312 allow for conditional instructions to be provided to processor 112 through digital certificate 140.

Figure 4:
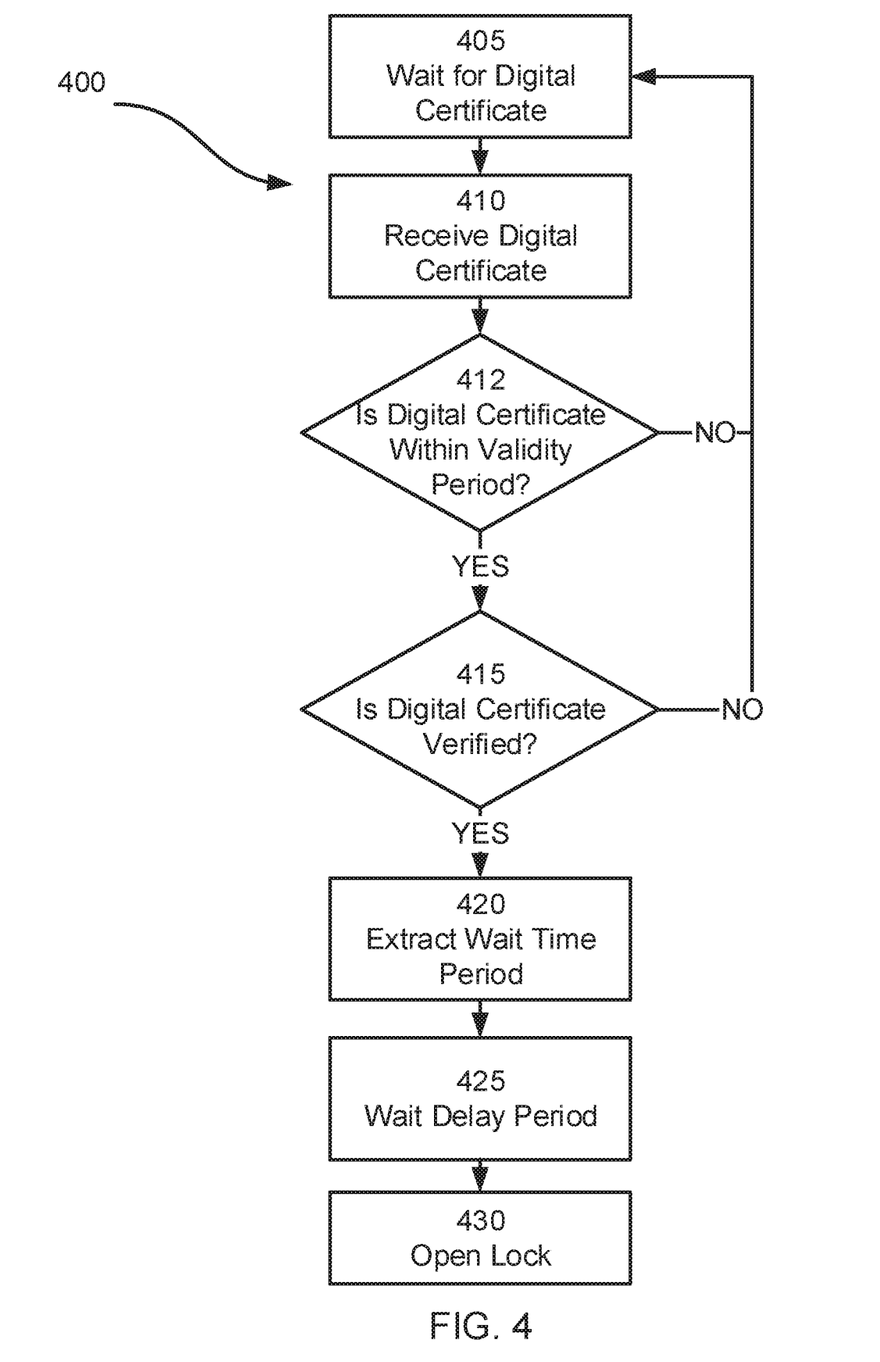
FIG. 4 is a flowchart of an example of the processor of the lock interacting with a wait time parameter.

Wait time parameter 316 includes a time frame upon which processor 112 will wait, after which processor 112 can open lock 104 using electrical actuator 128. Referring to FIG. 4, flowchart 400 shows an embodiment of the instructions that processor 112 executes when encountering wait time parameter 316.

At block 405, processor 112 waits to receive digital certificate 140 from lock access devices 136 through communications interface 108. In the current embodiment, digital certificate 140 is sent by lock access devices 136 through network 132 to be received by communications interface 108. Other forms of sending and receiving digital certificate 140 are contemplated. At block 410, processor 112 receives digital certificate 140.

At block 412, processor 112 compares the system time of lock 104 with validity period 304. If the system time of lock 104 is after or before validity period 304, then digital certificate 140 is not valid, and processor 112 returns to waiting for the next digital certificate 140. If the system time of lock 104 is during validity period 304, then digital certificate 140 is valid.

At block 415, processor 112 verifies or authenticates digital certificate 140. In the current embodiment, verification is done by ensuring digital signature 332 corresponds to public key 120. If digital signature 332 does not correspond to public key 120, processor 112 does not proceed to open lock 104 and returns to waiting for a new digital certificate 140. If digital signature 332 corresponds to public key 120, then processor 112 can proceed to extract certificate parameters 312.

At block 420, processor 112 extracts certificate parameter 312. In the current embodiment, processor 112 extracts wait time parameter 316. Processor 112 then proceeds to wait the delay period at block 425. At block 430, processor 112 controls electrical actuator 128 and unlocks lock 104.

For example, if the wait time parameter 316 were 2 hours, then processor 112 would extract wait time parameter 316 from digital certificate 140 and proceed to set a timer for two hours. After the timer has expired, processor 112 would open lock 104 using electrical actuator 128.

Figure 5:
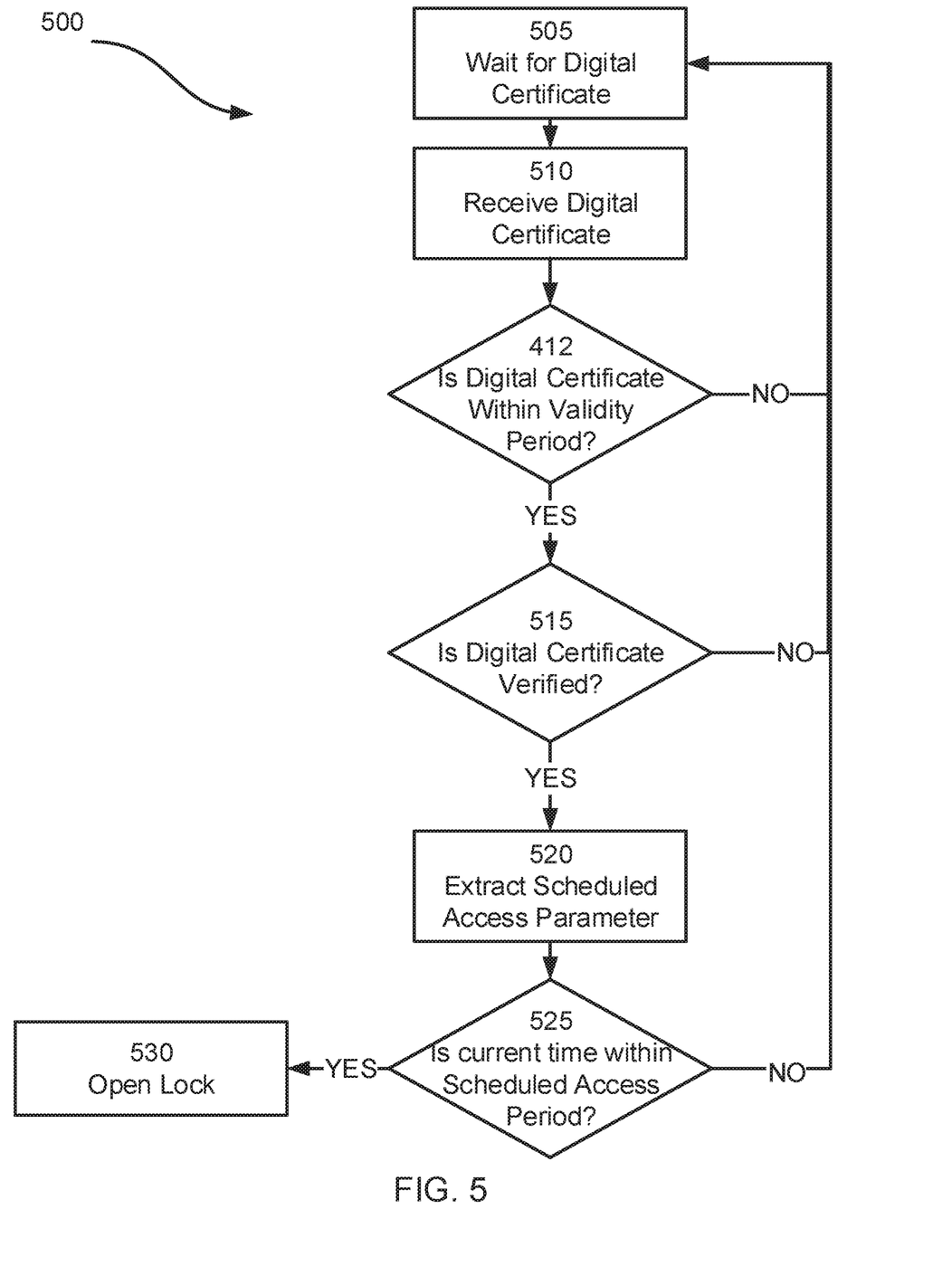
FIG. 5 is a flowchart of an example of the processor of the lock interacting with a scheduled access period parameter.

Scheduled access period parameter 320 includes scheduling blackout periods or whiteout periods that digital certificate 140 can be used. Referring to FIG. 5, flowchart 500 shows an embodiment of the instructions that processor 112 executes when encountering scheduled access period parameter 320.

Blocks 505, 510, 512 and 515 are similar to blocks 405, 410 and 415 in FIG. 4. At block 520, processor 112 extracts scheduled access period parameter 320. At block 525, processor 112 checks the system time on lock 104 to determine whether the system time is within the scheduled access period based on scheduled access period parameter 320. If the system time is not within the scheduled access period, then processor 112 returns to waiting for a digital certificate at block 505. If the system time is within the scheduled access period, then processor 112 controls electrical actuator 128 and unlocks lock 104 at block 530.

For example, scheduled access period parameter 320 may be "ALLOW; MON:0800-1600, WED:0900-1200, FRI: 0500-0530". Processor 112 would extract this, and interpret it as allowing access to the lock on Monday between 8 AM and 4 PM, on Wednesday between 9 AM and 12 PM, and Friday between 5 AM and 5:30 AM. Processor 112 can then check system time, and if system time is within any of the time frames specified, then processor 112 would proceed to open lock 104 through electrical actuator 128.

In another example, scheduled access period parameter 320 may be "DENY; TUES:0000-2359". Processor 112 would extract this, and interpret it as allowing access to the to the lock on every day of the week except all day Tuesday. Processor 112 can then check system time, and if system time shows Tuesday, then processor 112 will return to wait for digital certificate 140. If system time shows any day other than Tuesday, then processor 112 would proceed to open lock 104 through electrical actuator 128.

In another embodiment, scheduled access period parameter 320 may use a byte (8 bits) to represent days of the week that are allowed or not allowed in a binary manner. The first 7 bits may represent the days of the week, and the 8th bit may represent whether the days are allowed or not. For example, setting bits 1, 3, 5, and 8 to be 1, (1, 0, 1, 0, 1, 0, 0, 1) may mean that Sunday, Tuesday, and Thursday are allowed days. In another example, setting bits 1, 3, and 5 to be 1, (1, 0, 1, 0, 1, 0, 0, 1) may mean that Sunday, Tuesday, and Thursday are days not allowed. In another example, setting bits 1 and 6 to be 1 (1, 0, 0, 0, 0, 1, 0, 0) may mean that Sunday and Friday are days not allowed.

Figure 6:
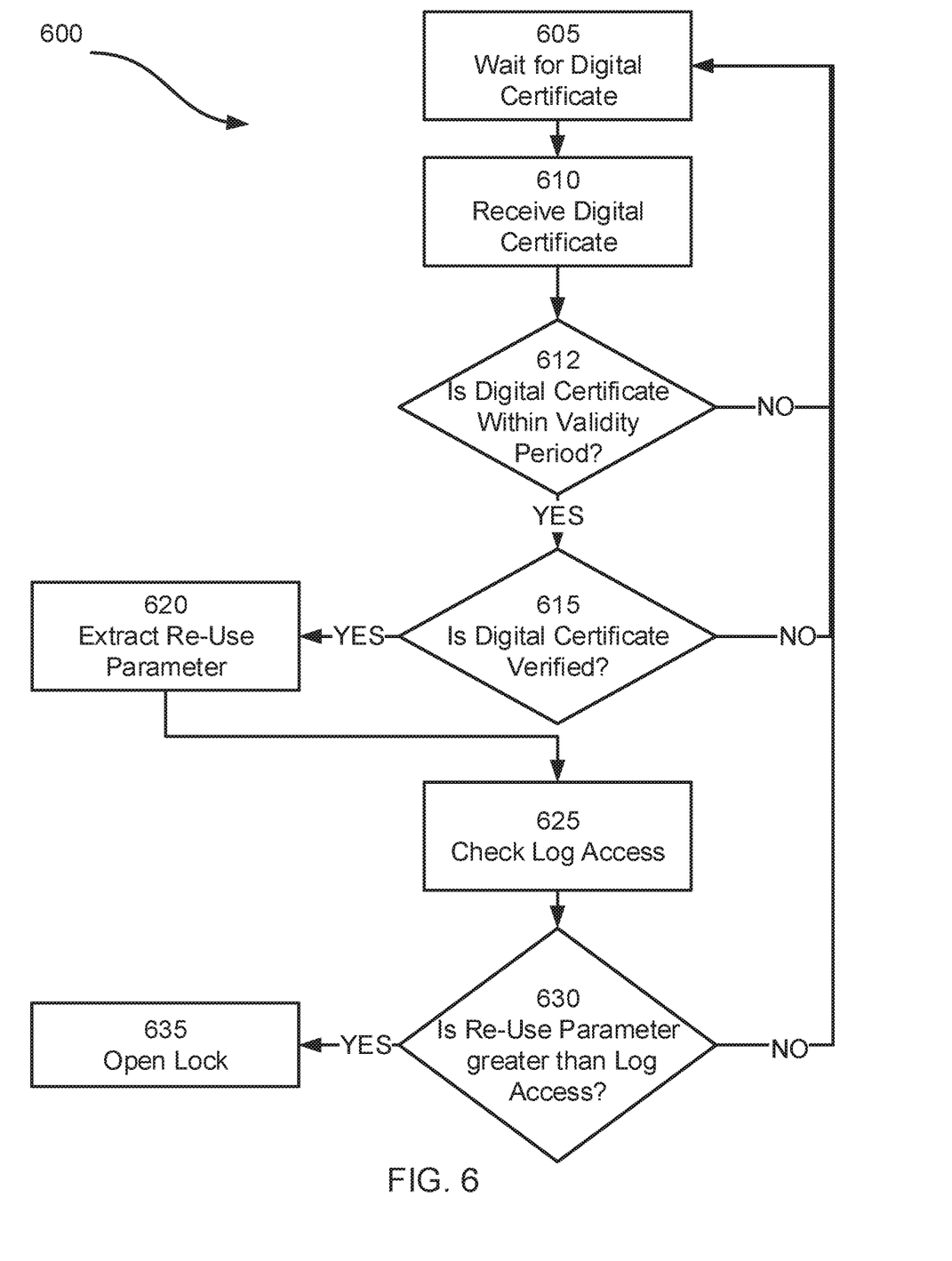
FIG. 6 is a flowchart of an example of the processor of the lock interacting with a re-use parameter.

Re-use parameter 324 includes the number of times that digital certificate 140 may be used on lock 104. Referring to FIG. 6, flowchart 600 shows an embodiment of the instructions that processor 112 executes when encountering re-use parameter 324.

Blocks 605, 610, 612 and 615 are similar to blocks 405, 410 and 415 in FIG. 4. At block 620, processor 112 extracts re-use parameter 324. At block 625, processor 112 checks access log 124 for previous access by the same digital certificate 140. If re-use parameter 324 is greater than the number of times accessed indicated by access log 124 (at block 630), then processor 112 proceeds to open lock 104 through electrical actuator 128 at block 635. If re-use parameter 324 is less than or equal to the number of times accessed indicated by access log 124, then processor 112 returns to waiting for digital certificate 140 at block 605.

In another embodiment, at block 625 digital certificate 140 may include a digital certificate log. The digital certificate log may include a historical list of when digital certificate 140 was used to access lock 104. Processor 112 may check digital certificate log for previous access. If re-use parameter 324 is greater than the number of times accessed indicated by digital certificate log, then processor 112 proceeds to open lock 104 through electrical actuator 128 at block 635. If re-use parameter 324 is less than or equal to the number of times indicated by digital certificate log, then processor 112 returns to waiting for the next digital certificate 140 at block 605.

The re-use parameter 324 may be set to any suitable value for a desired number of accesses, such as 1, 2, 3, 5, 10, or more. For example, re-use parameter 324 may be "5". Processor 112 may check access log 124 for previous access. If the number of times digital certificate 140 has been used is less than 5, then processor 112 can proceed to open lock 104 through electrical actuator 128.

The methods described by flowcharts 400, 500, 600 may be combined. A particular lock may be configured to evaluate any combination of wait time parameter, scheduled access period parameter, and re-use parameter. For example, a particular lock may be configured to allow 2 re-uses after a 10 minute wait at any time. In another example, a lock may be configured to only be accessed on Tuesdays up to 3 times, as set by a re-use parameter. The methods described by flowcharts 400, 500, 600 therefore allow for complex access models to be constructed. Further, it is important to note that, because the parameters are associated with a digital certificate, access may be controlled on a per-user basis, such that each person allowed to open the lock may be provided with a unique set of parameters that govern the time and amount of access.

Returning to FIG. 3, application specific data 308 is a parameter that indicates the purpose of digital certificate 140. While the most common use case of digital certificate 140 may be to unlock lock 104, other forms of access can be contemplated. Other forms of access may include performing updates to lock 104, providing a new public key 120 or reviewing access log 124.

Authentication parameter 328 may include previous authentication of a user on lock access device 136. Prior methods of authentication on lock access device 136 may include passwords, pin numbers, fingerprints and facial recognition. For example, if a user was previously authenticated on lock access device 136 by providing a correct pin, authentication parameter may be set to a verified status, which when extracted by processor 112, may allow processor 112 to open lock 104 through electrical actuator 128.

In other embodiments, authentication parameter 328 may act as a warning system and allow lock 104 and processor 112 to perform different actions. For example, different pin numbers may provide for different responses from lock 104. If the user of lock access device 136 were under duress to provide access to lock 104, the user may provide a different pin number, which may grant the automatic addition of wait time parameter 316. In a scenario where a user were under duress, adding the wait time parameter 316 automatically, may provide time for the authorities to arrive and aid the user. Other scenarios and uses of different authentication parameters leading to different behaviors for lock 104 and processor 112 may be contemplated.

By using digital certificate 140, processor 112 is able to securely lock and unlock lock 104 while maintaining the flexibility of having wait times, blackout periods, or a limited number of re-uses. Using digital certificate 140 keeps the lock secure, making it more difficult to spoof a signal to the lock. In addition, by including certificate parameters 312, the use of digital certificate 140 becomes much more flexible, lowering the number of times that digital certificate 140 may have be to issued.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A lock for securing access to a physical resource, the lock comprising:
   a wireless interface configured for communication with a plurality of lock access devices in vicinity of the lock, the wireless interface configured to receive digital certificates from the plurality of lock access devices;
   a memory configured to store a public key; and
   a processor configured to authenticate a digital certificate received from a lock access device of the plurality of lock access devices using the public key, the processor further configured to extract a wait time parameter from the digital certificate, the processor further configured to control an electrical actuator of the lock to unlock the lock after a delay period based on the wait time parameter.

2. The lock of claim 1, wherein the processor is further configured to extract a scheduled access period parameter from the digital certificate and to limit the electrical actuator to unlock the lock during a scheduled access period based on the scheduled access period parameter.

3. The lock of claim 1, wherein the processor is further configured to extract a re-use parameter from the digital certificate and to limit the electrical actuator to unlock the lock a number of times indicated by the re-use parameter.

4. The lock of claim 3, wherein the memory is further configured to store a log of access, and wherein the processor is further configured to compare a number of times accessed indicated by the log of access against the re-use parameter and to limit the electrical actuator to unlock the lock if the number of times indicated by the re-use parameter is greater than the number of times accessed indicated by the log of access.

5. The lock of claim 3, wherein the digital certificate is further configured to store a digital certificate log, and wherein the processor is further configured to compare a number of times accessed indicated by the digital certificate log against the re-use parameter and to limited the electrical actuator to unlock the lock if the number of times indicated by the re-use parameter is greater than the number of times accessed indicated by the digital certificate log.

6. The lock of claim 1, wherein the processor is further configured to extract an authentication parameter from the digital certificate and to limit the electrical actuator to unlock the lock if the authentication parameter indicates that a user has previously authenticated their identity on a lock access device.

7. A lock for securing access to a physical resource, the lock comprising:
   a wireless interface configured for communication with a plurality of lock access devices in vicinity of the lock, the wireless interface configured to receive digital certificates from the plurality of lock access devices;
   a memory configured to store a public key; and
   a processor configured to authenticate a digital certificate received from a lock access device of the plurality of lock access devices using the public key, the processor further configured to extract a scheduled access period parameter from the digital certificate and to limit the electrical actuator to unlock the lock during a scheduled access period based on the scheduled access period parameter.

8. The lock of claim 7, wherein the processor is further configured to monitor the current time and compare it to the scheduled access period and to limit the electrical actuator to unlock the lock if the current time is within the scheduled access period based on the scheduled access period parameter.

9. The lock of claim 7, wherein the scheduled access period is shorter than a life span of the digital certificate.

10. The lock of claim 7, wherein the processor is further configured to extract a re-use parameter from the digital certificate and to limit the electrical actuator to unlock the lock a number of times indicated by the re-use parameter.

11. The lock of claim 10, wherein the memory is further configured to store a log of access, and wherein the processor is further configured to compare a number of times accessed indicated by the log of access against the re-use parameter and to limit the electrical actuator to unlock the lock if the number of times indicated by the re-use parameter is greater than the number of times accessed indicated by the log of access.

12. The lock of claim 10, wherein the digital certificate is further configured to store a digital certificate log, and wherein the processor is further configured to compare a number of times accessed indicated by the digital certificate log against the re-use parameter and to limited the electrical actuator to unlock the lock if the number of times indicated by the re-use parameter is greater than the number of times accessed indicated by the digital certificate log.

13. The lock of claim 7, wherein the processor is further configured to extract an authentication parameter from the digital certificate and to limit the electrical actuator to unlock the lock if the authentication parameter indicates that a user has previously authenticated their identity on a lock access device.

14. A lock for securing access to a physical resource, the lock comprising:
a wireless interface configured for communication with a plurality of lock access devices in vicinity of the lock, the wireless interface configured to receive digital certificates from the plurality of lock access devices;
a memory configured to store a public key; and
a processor configured to authenticate a digital certificate received from a lock access device of the plurality of lock access devices using the public key, the processor further configured to extract a re-use parameter from the digital certificate and to limit the electrical actuator to unlock the lock a number of times indicated by the re-use parameter.

15. The lock of claim 14, wherein the memory is further configured to store a log of access, and wherein the processor is further configured to compare a number of times accessed indicated by the log of access against the re-use parameter and to limit the electrical actuator to unlock the lock if the number of times indicated by the re-use parameter is greater than the number of times accessed indicated by the log of access.

16. The lock of claim 14, wherein the digital certificate is further configured to store a digital certificate log, and wherein the processor is further configured to compare a number of times accessed indicated by the digital certificate log against the re-use parameter and to limited the electrical actuator to unlock the lock if the number of times indicated by the re-use parameter is greater than the number of times accessed indicated by the digital certificate log.

17. The lock of claim 14, wherein the number of times indicated by the re-use parameter is five or fewer.

18. The lock of claim 14, wherein the processor is further configured to extract an authentication parameter from the digital certificate and to limit the electrical actuator to unlock the lock if the authentication parameter indicates that a user has previously authenticated their identity on a lock access device.

* * * * *